United States Patent [19]
McWilliams

[11] Patent Number: 5,486,323
[45] Date of Patent: Jan. 23, 1996

[54] METHOD OF FORMING COMPACTED LAYER

[75] Inventor: Joseph A. McWilliams, Droitwich, United Kingdom

[73] Assignee: Ceramaspeed Limited, United Kingdom

[21] Appl. No.: 339,006

[22] Filed: Nov. 14, 1994

[30] Foreign Application Priority Data

Nov. 25, 1993 [GB] United Kingdom ............ 9324272

[51] Int. Cl.⁶ .................................................. B29C 43/18
[52] U.S. Cl. .................................... 264/112; 264/109
[58] Field of Search ............................ 264/112, 109

[56] References Cited

U.S. PATENT DOCUMENTS

| | | | |
|---|---|---|---|
| 2,900,664 | 8/1959 | Hampel et al. | |
| 3,998,573 | 12/1976 | Gilbert | 425/117 |
| 4,334,850 | 6/1982 | Garabedian | 425/388 |
| 4,792,466 | 12/1988 | McWilliams et al. | 427/177 |
| 5,076,984 | 12/1991 | Bisplinghoff et al. | 264/102 |

FOREIGN PATENT DOCUMENTS

| | | |
|---|---|---|
| 0211682 | 2/1987 | European Pat. Off. . |
| 490973 | 8/1938 | United Kingdom . |
| 815027 | 6/1959 | United Kingdom . |
| 1217541 | 12/1970 | United Kingdom . |
| 1413130 | 11/1975 | United Kingdom . |
| 2206523 | 1/1989 | United Kingdom . |

*Primary Examiner*—Mary Lynn Theisen
*Attorney, Agent, or Firm*—Ira S. Dorman

[57] ABSTRACT

A layer of compacted powdery microporous material is formed in a container of substantially air-impervious material by providing at least one air outlet region in the container together with barrier means which is adapted and arranged to substantially prevent passage therethrough of microporous material during compaction thereof, whilst permitting permeation of air displaced therefrom during such compaction. Also provided in the container is means to enable the displaced air permeating at least part of the barrier means during compaction of the microporous material to flow laterally of the direction of movement of a press tool between at least part of the barrier means and the base of the container toward the at least one air outlet region so as to be displaced from the container therethrough.

46 Claims, 6 Drawing Sheets

METHOD OF FORMING COMPACTED LAYER

This invention relates to microporous materials, particularly but not exclusively to microporous thermal insulation materials, and more especially to a method of forming compacted layers of such materials in powder form in containers formed of substantially air-impervious material.

BACKGROUND TO THE INVENTION

The invention is especially, but not exclusively, applicable to the formation of a layer of compacted powdery microporous thermal insulation material in a supporting dish for a radiant electric heater such as is used in smooth top glass ceramic cooking appliances.

The term 'microporous' is used herein to identify porous or cellular materials in which the ultimate size of the cells or voids is less than the mean free path of an air molecule at NTP, i.e. of the order of 100 nm or smaller. A material which is microporous in this sense will exhibit very low transfer of heat by air conduction (that is collisions between air molecules). Such microporous materials include aerogel, which is a gel in which the liquid phase has been replaced by a gaseous phase in such a way as to avoid the shrinkage which would occur if the gel were dried directly from a liquid. A substantially identical structure can be obtained by controlled precipitation from solution, the temperature and pH being controlled during precipitation to obtain an open lattice precipitate. Other equivalent open lattice structures include pyrogenic (fumed) and electrothermal types in which a substantial proportion of the particles have an ultimate particle size less than 100 nm. Any of these materials, based for example on silica, alumina or other metal oxides, may be used to prepare a composition which is microporous as defined above.

Known forms of microporous materials comprise compacted microporous metal oxide particles, particularly silica, and typically including ceramic fibre or glass filament reinforcement and rutile powder opacifier. Alumina is sometimes included to improve high temperature performance by reducing shrinkage, this being particularly important in radiant electric heater applications.

DESCRIPTION OF PRIOR ART

In the manufacture of radiant electric heaters for glass ceramic top cooking appliances, microporous thermal insulation material is compacted into a metal dish to form a thermal and electrical insulating base which is used directly or indirectly as a support for one or more electrical heating elements. In a method of producing such a base according to the prior art, a sheet of air-pervious paper, such as filter paper, is placed inside the metal dish and covering an array of small holes provided in the bottom of the dish around the periphery thereof. A predetermined quantity of powdery microporous thermal insulation material is disposed between a press tool and the dish and is compacted into the dish by the press tool. During this compacting process, air is displaced and escapes from the dish at the periphery thereof, through the peripheral array of holes in the dish and also between the rim of the dish and the periphery of the press tool.

A disadvantage has been found in that the resulting compacted microporous insulation material does not exhibit uniform density. The density is greater at the peripheral region than at the central region of the compacted layer and this means that the mechanical strength of the layer, although satisfactory at the periphery, may be unsatisfactory in the central region. I have found the reason for this is that, during the compacting operation, the majority of the air is displaced laterally to the periphery of the dish through the microporous insulation material rather than by first passing through the air-pervious paper and then laterally to the periphery of the dish. The material being compacted urges the paper into tight contact with the inside surface of the dish and this prevents air from permeating the paper and flowing laterally between the paper and the dish to the outlet regions provided at the edge of the dish.

When the air is displaced laterally through the microporous material towards the periphery of the dish, lateral force is exerted on the material with the result that it undergoes greater compaction towards the periphery of the dish with greater resultant density than at the central region of the dish.

OBJECT OF THE INVENTION

It is an object of the present invention to overcome this problem by providing a method which results in the formation of a compacted layer of microporous material of more uniform density.

SUMMARY OF THE INVENTION

Accordingly, the present invention provides a method of forming a layer of compacted powdery microporous material in a container of substantially air-impervious material, which method comprises the steps of:

providing a container of substantially air-impervious material, the container having a base, side walls and at least one air outlet region;

providing a press tool for compacting powdery microporous material into the container, the press tool being movable in a direction toward and away from the base of the container;

providing barrier means adjacent at least the base of the container, the barrier means being adapted and arranged to substantially prevent passage therethrough of microporous material during compaction thereof, whilst permitting permeation of air displaced therefrom during such compaction;

providing means to enable the displaced air permeating at least part of the barrier means during compaction of the microporous material to flow laterally of the direction of movement of the press tool between the at least part of the barrier means and at least the base of the container;

introducing powdery microporous material between the container and the press tool; and compacting the microporous material into the container by means of the press tool whereby air is displaced from within the microporous material, permeates the at least part of the barrier means, and flows laterally between the at least part of the barrier means and at least the base of the container toward the at least one air outlet region so as to be displaced from the container therethrough.

The microporous material may comprise microporous thermal insulation material.

The at least one air outlet region is suitably provided at a peripheral region of the container.

The at least one air outlet region may comprise at least one hole in the container.

A plurality of air outlet regions may be provided.

The barrier means may comprise at least one layer of an inherently air-pervious material, such as air-pervious paper, e.g. filter paper, or fine mesh or gauze material, or cloth material, e.g. of woven, mat or felt form.

Alternatively the barrier means may comprise at least one sheet of material provided with an array of holes therein dimensioned to allow displacement of air therethrough while substantially preventing passage of microporous material. Such at least one sheet of material may be a material which is pervious or impervious to air and may, for example, comprise paper, or card, or metal foil, or plastics, or cloth material.

The means to enable lateral flow of the displaced air permeating the barrier means to the at least one air outlet region may be provided in a number of ways. It may be separate from or integral with the barrier means.

When provided separate from the barrier means it suitably comprises a stand-off arrangement located on or integral with the inside surface of the container and serving to maintain sufficient separation of the barrier means and the container during compaction of the microporous material to enable displaced air permeating the barrier means to flow laterally to the at least one air outlet region.

The stand-off arrangement may comprise a sheet of woven material, particularly a woven mesh material, or a framework arranged between the barrier means and the container.

Alternatively the stand-off arrangement may comprise at least one protrusion on the inside of the container and facing the barrier means. Such at least one protrusion may be formed integrally with the container, e.g. in the form of at least one pip and/or at least one rib, or may be applied to the container e.g. in the form of a raised pattern of paint or lacquer or enamel, or in the form of at least one adhesively-secured discrete component.

The means to enable lateral flow of the displaced air may comprise at least one channel recessed into the container and facing the barrier means, the at least one channel communicating with the at least one air outlet region.

For economy and simplicity, the barrier means may have formed integrally therewith the means to enable flow of the displaced air permeating the barrier means to the at least one air outlet region. This may be achieved in various ways, as follows.

The barrier means may be formed with stand-off and/or channel means on that surface thereof facing the container. This may suitably be arranged by part of the material of the barrier means being displaced in a direction towards the container, such as by providing at least one plunged aperture through the barrier means from that side of the barrier means adjacent to the microporous material.

As an alternative, the barrier means may be formed so as to present a quilted or ribbed surface profile, or a surface profile comprising a pattern of elevations and/or channels, e.g. a raised dot pattern, on that surface thereof facing the container.

The present invention also provides a method of forming a layer of compacted powdery microporous material in a container of substantially air-impervious material, which method comprises the steps of:

providing a container of substantially air-impervious material, the container having a base, side walls and at least one air outlet region;

providing a press tool for compacting powdery microporous material into the container, the press tool being movable in a direction toward and away from the base of the container;

providing barrier means adjacent at least the base of the container, the barrier means being constructed from first and second sheets of air-pervious material bonded together at predetermined spaced-apart discrete regions and adapted and arranged to substantially prevent passage therethrough of microporous material during compaction thereof, whilst permitting permeation of air displaced therefrom during such compaction, the barrier means enabling the displaced air permeating the first sheet of air-pervious material during compaction of the microporous material to flow laterally of the direction of movement of the press tool between the first and second sheets;

introducing powdery microporous material between the container and the press tool; and compacting the microporous material into the container by means of the press tool whereby air is displaced from within the microporous material, permeates the first sheet of air-pervious material of the barrier means, and flows laterally between the first and second sheets of air-pervious material toward the at least one air outlet region so as to be displaced from the container therethrough.

If the barrier means is constructed in the form of a woven mesh material, that surface thereof facing the container is naturally profiled such that it inherently serves to channel the air displaced through the barrier means to the at least one air outlet region.

The area of the press tool preferably corresponds substantially to the area of the base of the container.

The press tool is advantageously provided with at least one hole therethrough for the passage of air displaced from the microporous material during compaction thereof.

In a particular embodiment, the container comprises a supporting dish, particularly of metal, of a radiant electric heater, such as for use in a smooth top glass ceramic cooking appliance.

By means of the method of the invention air is able to be readily displaced from within the microporous material through the barrier means during compacting of the microporous material, and then flows laterally, without hindrance, to the air outlet region or regions in the container. By this means the resulting compacted layer of material exhibits greater uniformity of density.

The invention is now described by way of example with reference to the accompanying drawings, in which:

DESCRIPTION OF PREFERRED EMBODIMENTS

Figure 1:
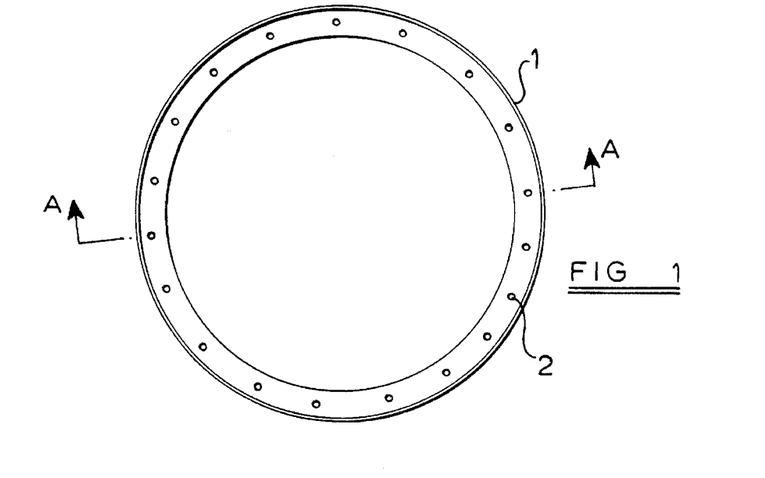
FIG. 1 is a top plan view of a container into which microporous thermal insulation material is to be compacted.
Figure 2:
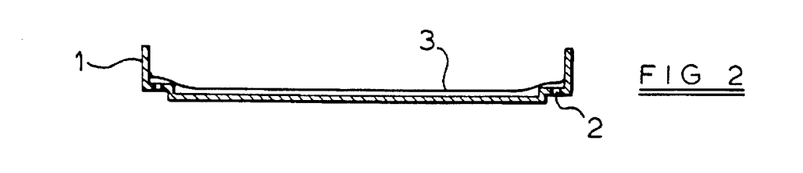
FIG. 2 is a cross-sectional view along the line A—A of the container of FIG. 1 with a barrier means arranged therein.

Referring to FIGS. 1 and 2, a container having a base and side walls is provided in the form of a metal dish 1 which is suitable for use, for example, as a housing of a radiant electric heater for a glass ceramic top cooking appliance. The dish 1 is provided with an air outlet region in the form of an array of holes 2 around the periphery of the base thereof, although such holes may be provided at other locations in the dish if required.

Figure 3:
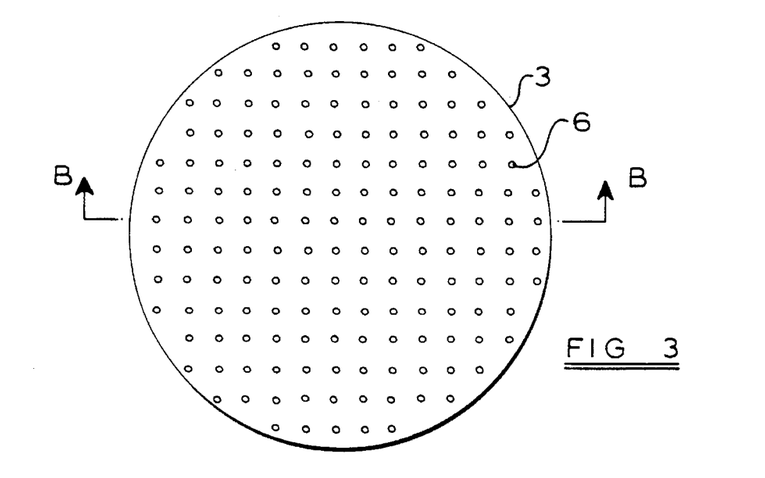
FIG. 3 is a plan view of a combined barrier means and displaced air flow enabling means for use inside the container of FIG. 1.
Figure 4:
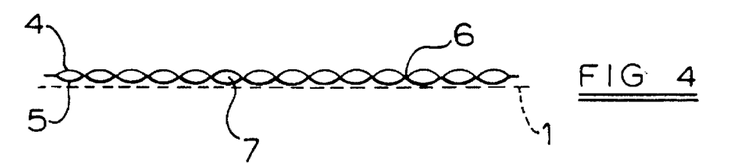
FIG. 4 is a cross-sectional view, on a larger scale, along the line B—B in FIG. 3.

A sheet 3 of air-pervious paper is provided to form an interference fit inside the dish 1 and covering the peripheral holes 2. The sheet 3 is configured as shown in FIG. 3 and, on a larger scale, in FIG. 4 and is constructed of two plies 4, 5 bonded together in predetermined discrete spaced-apart regions such as spots 6. The spacing between the plies 4, 5 in FIG. 4 is exaggerated for clarity. As a result of this construction, lateral channels 7 (FIG. 4) are provided between the two plies 4, 5 of the sheet 3.

Figure 5:
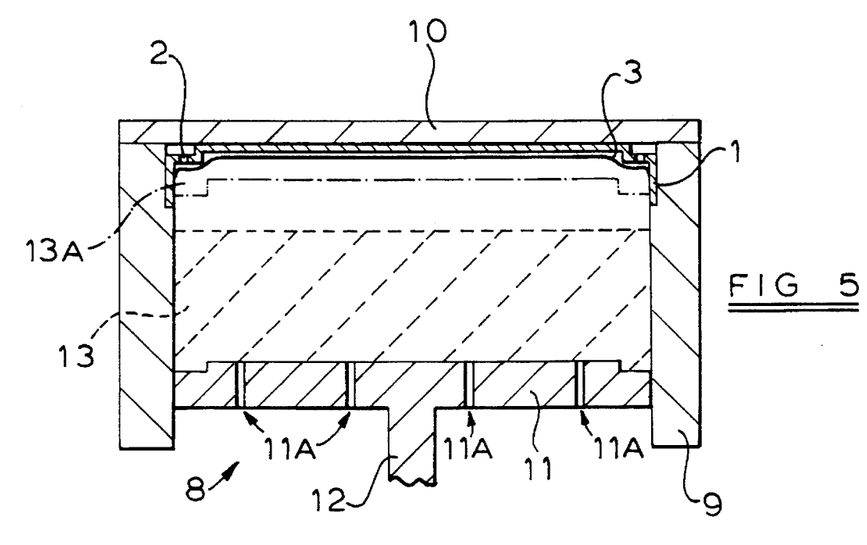
FIG. 5 is a schematic sectional view of an arrangement for use in the method of the invention to form a compacted layer of microporous insulation material in the container of FIGS. 1 and 2.

Referring now to FIG. 5, there is shown a press 8 comprising a housing 9, a cover 10, and a press tool 11 operated by a piston arrangement 12. The area of the press tool 11 corresponds substantially to the area of the base of the dish 1 so that only a minimal clearance remains between the edge of the press tool and the rim of the dish. The upper end of the housing 9 is recessed to receive the rim of the metal dish 1 of FIGS. 1 and 2. To facilitate displacement of air from within that part of the microporous material in the region of the press tool, the press tool 11 is provided with at least one hole 11A therethrough for the passage of air displaced from the microporous material during compaction thereof.

With the cover 10 removed and the press tool 11 in the position shown in FIG. 5, a predetermined quantity of powdery microporous thermal insulation material 13 is introduced into the press 8 on top of the press tool 11. The metal dish 1 with the sheet 3 therein, is then placed in the recess in the upper end of the housing 9 and the cover 10 is closed and secured.

The press 8 is operated, for example hydraulically, via the piston arrangement 12, to urge the press tool 11 towards the metal dish 1, thereby compacting the microporous insulation material 13 into the dish 1. During compaction of the microporous insulation material 13, air is displaced from within the microporous material in the direction of the dish 1 and permeates the ply 4 (FIG. 4) of the air-pervious sheet 3, i.e. that ply of the sheet 3 which is adjacent to the insulation material 13. Although the sheet 3 allows the displaced air to permeate therethrough, it acts as a barrier means to the insulation material 13. The displaced air than passes, laterally of the direction of movement of the press tool 11, between the two plies 4, 5 (FIG. 4) of the sheet 3, through the channels 7 (FIG. 4) which are effectively provided, and exits the dish 1 through the peripheral holes 2 in the dish 1, the holes 2 serving as air outlet regions. Such enabling of the air displaced during the microporous insulation material compacting operation to readily flow laterally to the peripheral holes 2 in the dish 1, after permeating the ply 4 of the sheet 3, results in a compacted layer 13A of insulation material of substantially uniform density throughout.

Figure 6:
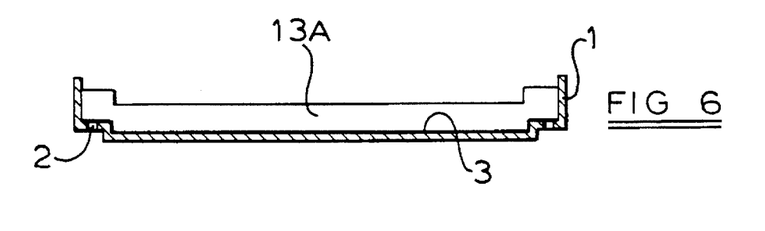
FIG. 6 is a cross-sectional view of the container of FIGS. 1 and 2 having a layer of microporous insulation material compacted therein by the method of the invention as by the arrangement of FIG. 5.

The dish 1 with the compacted microporous insulation material 13A therein is then removed from the press 8, after opening the cover 10, and has the form shown in FIG. 6.

In an alternative arrangement, instead of the sheet 3 being constructed of multi-ply form to permit displaced air to flow laterally between plies thereof to the outlet holes 2, it is arranged for the displaced air to fully permeate the sheet and means are provided on that side of the sheet adjacent to the dish 1 to enable lateral channelling of the displaced air to the outlet holes 2 to take place between the sheet and the adjacent surface of the dish 1.

This can be effected in a number of ways.

Figure 7:
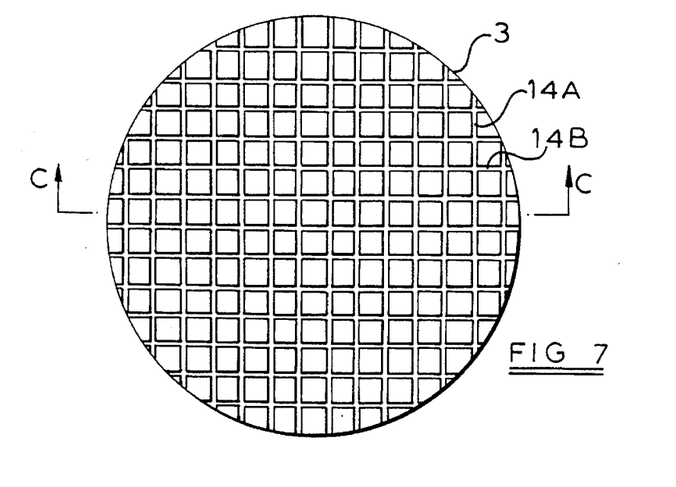
FIG. 7 is a bottom plan view of another embodiment of a combined barrier means and displaced air flow enabling means for use in the container of FIG. 1.
Figure 8:
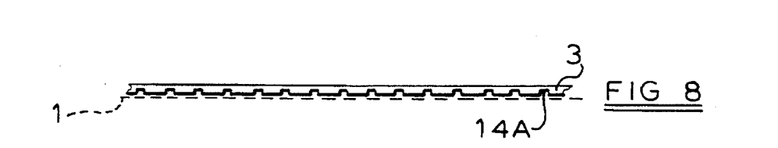
FIG. 8 is a cross-sectional view along the line C—C in FIG. 7.

In one arrangement, as shown in FIGS. 7 and 8, the sheet 3 may be formed of air-pervious material, particularly air-pervious paper, which is of quilted form such that channels (or grooves) 14A, 14B running in two directions generally perpendicular to one another are formed in that surface thereof facing the dish 1. It should be noted that the depth of the channels 14A and 14B is exaggerated in FIG. 8 for clarity. During compaction of the microporous insulation material into the dish 1, air displaced from within the microporous material permeates the sheet 3 and flows laterally along the channels 14A, 14B to the outlet holes at the periphery of the dish 1.

In a modification of this arrangement, instead of the sheet 3 being quilted such that the channels 14A, 14B are formed running in two directions, the sheet may be formed with a ribbed (or corrugated) structure on the face adjacent to the dish 1, so that channels (either 14A or 14B) running in one direction only are provided to enable the displaced air permeating the sheet 3 to flow laterally to the outlet holes 2 in the dish 1.

Figure 9:
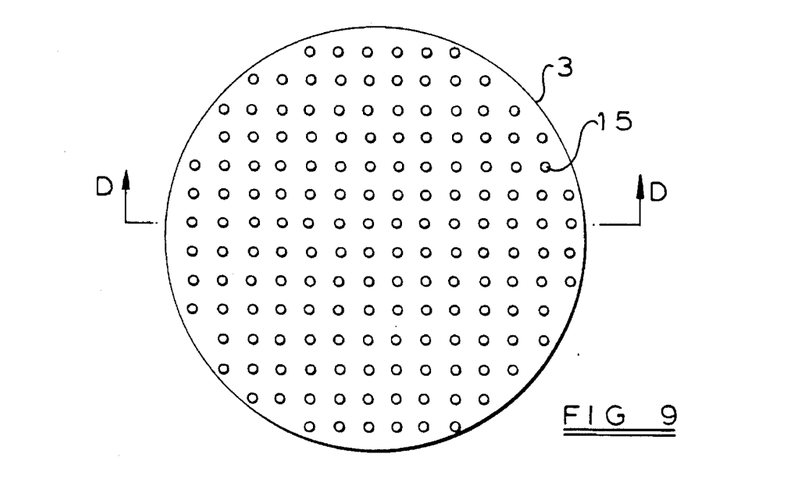
FIG. 9 is a bottom plan view of another embodiment of a combined barrier means and displaced air flow enabling means for use in the container of FIG. 1.
Figure 10:
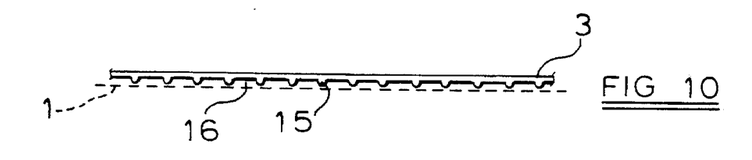
FIG. 10 is a cross-sectional view along the line D—D in FIG. 9.

In another arrangement, shown in FIGS. 9 and 10, the sheet 3 is provided with protrusions, such as pips 15, on that surface thereof facing the dish 1. It should be noted that the height of the pips 15 is exaggerated in FIG. 10 for clarity. Such pips 15 provide channels 16 between the sheet 3 and the dish 1, to allow the displaced air which permeates the sheet 3 to flow laterally to the outlet holes 2 in the dish 1. Alternative protrusions can be provided by forming the sheet 3 with a crinkled surface facing the dish 1.

Figure 11:
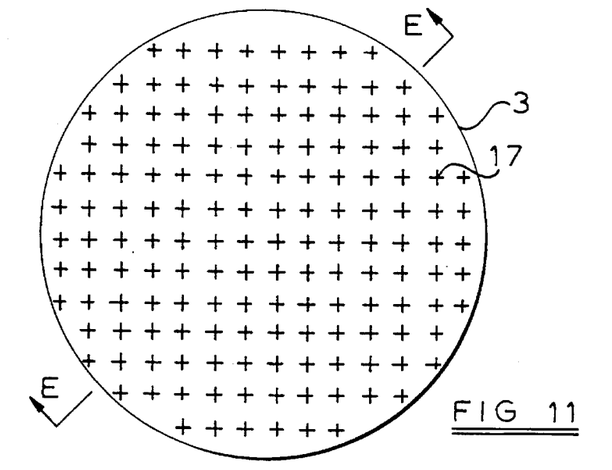
FIG. 11 is a bottom plan view of another embodiment of a combined barrier means and displaced air flow enabling means for use in the container of FIG. 1.
Figure 12:
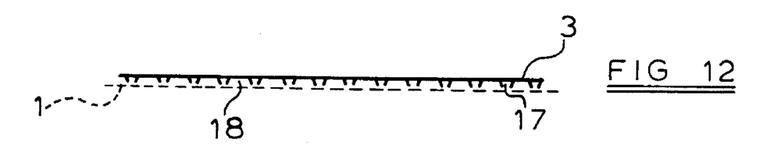
FIG. 12 is a cross-sectional view along the line E—E in FIG. 11.

In a further arrangement shown in FIGS. 11 and 12, the sheet 3 is provided with a series of plunged apertures 17 therethrough, which apertures provide a stand-off arrangement of the sheet 3 from the dish 1 and the formation of channels 18 which allow lateral flow to the outlet holes 2 in the dish 1 of the displaced air which permeates the sheet 3 during compaction of the insulation material 13 into the dish 1. It should be noted that the stand-off distance provided by the plunged apertures 17 is exaggerated in FIG. 12 for clarity. The plunged apertures 17 are dimensioned such that they do not allow substantial penetration therethrough of the microporous insulation material.

In the arrangements described with reference to FIGS. 7 to 12, although it is particularly convenient to form the sheet 3 from air-pervious paper, this is not essential and other materials can be employed. Such other materials may be air-pervious per se, for example cloth (or fabric) materials, such as of woven, mat or felt form, or fine mesh or gauze materials. Materials which are not air-pervious per se may also be used, such as impervious paper, card, plastics, or metal foil materials, these being rendered permeable to the displaced air by provision of an array of fine holes therethrough, such holes being of sufficiently small size to substantially prevent passage of the microporous insulation material. In the case of the embodiment shown in FIGS. 11 and 12, the provision of the plunged apertures 17 in an air-impervious material for the sheet 3 inherently provides the necessary air-permeability for the sheet 3.

Figure 13:
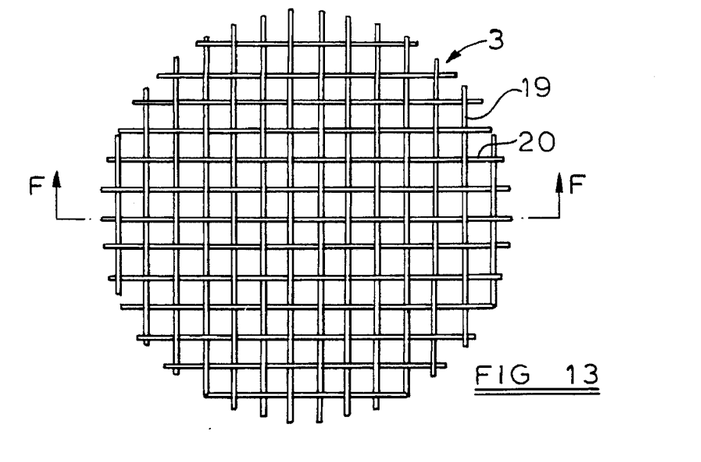
FIG. 13 is a bottom plan view of another embodiment of a combined barrier means and displaced air flow enabling means for use in the container of FIG. 1.
Figure 14:
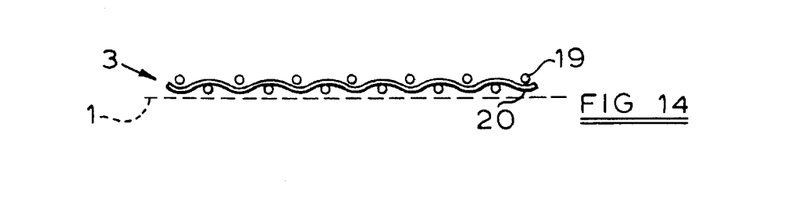
FIG. 14 is a cross-sectional view along the line F—F in FIG. 13.

A still further arrangement, shown in enlarged form in FIGS. 13 and 14, uses a fine woven mesh material, e.g. of metal or plastics, for the sheet 3. The weave of the strands 19, 20 of the mesh is arranged such that a barrier to the microporous insulation material is provided, while displaced air is able to pass through. The inherent nature of the woven mesh enables the displaced air which permeates through to flow laterally to the outlet holes 2 in the dish 1.

Figure 15:
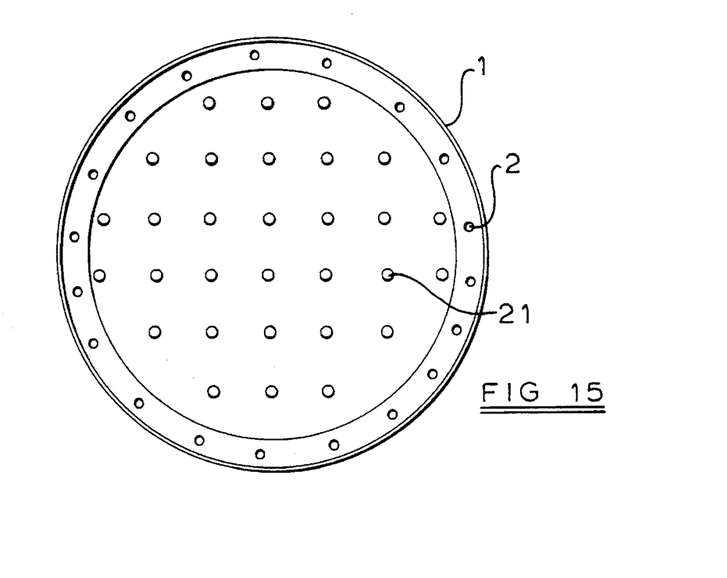
FIG. 15 is a top plan view of a container provided with an embodiment of displaced air flow enabling means.
Figure 16:
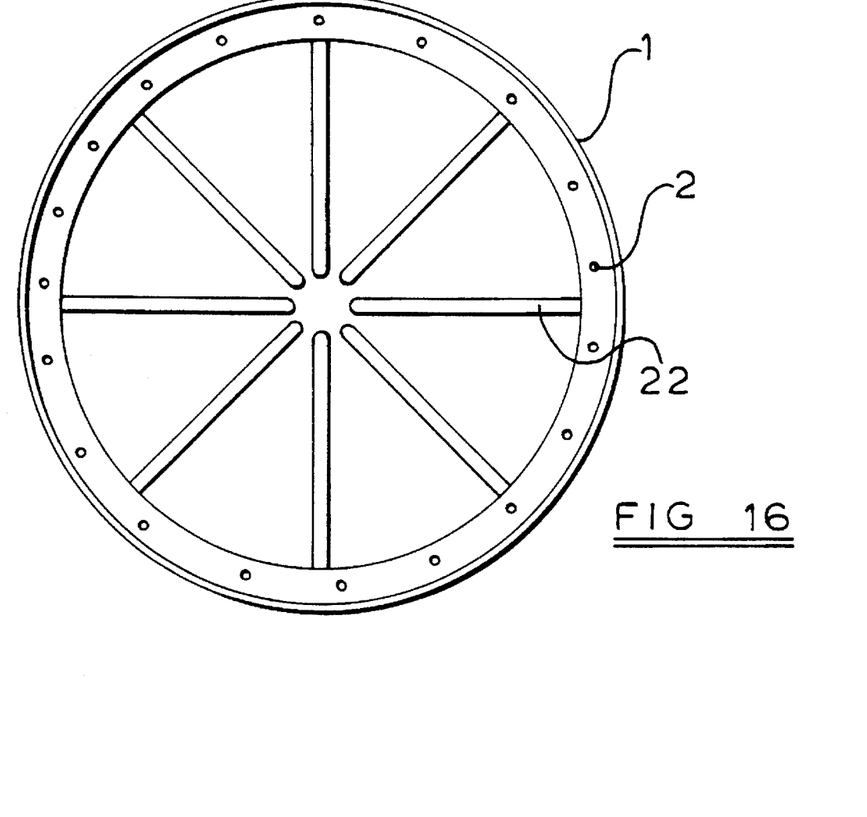
FIG. 16 is a top plan view of a container provided with a further embodiment of displaced air flow enabling means.

As shown with reference to FIGS. 15 and 16, it is also within the scope of the invention to provide, for use with a sheet of material which is permeable to the displaced air and acting as a barrier to the microporous insulation material, separate means co-operating with this barrier sheet to enable the displaced air, after permeating the sheet, to flow laterally between the sheet and the dish to the outlet holes in the dish. In the arrangement shown in FIG. 15, one or more protrusions, such as pips 21, are provided on the inside of the dish 1 and serving as a stand-off arrangement for the air-permeable barrier sheet, to enable the displaced air passing through the barrier sheet to flow laterally between the barrier sheet and the dish 1 to the outlet holes 2 in the dish.

In an alternative arrangement shown in FIG. 16, one or more protrusions, such as ribs and/or channels 22, are provided, the ribs and/or channels 22 protruding inwardly and/or outwardly from the inside surface of the dish and serving as a stand-off for the air-permeable barrier sheet in similar manner to the pips 21 in FIG. 15, to enable the air displaced from within the microporous insulation material in the insulation-compacting operation to flow laterally between the barrier sheet and the dish 1 to the outlet holes 2. Although the ribs and/or channels 22 are shown to be radially directed in FIG. 16, they need not be so and other arrangements can be provided to fulfill the necessary requirements.

Figure 17:
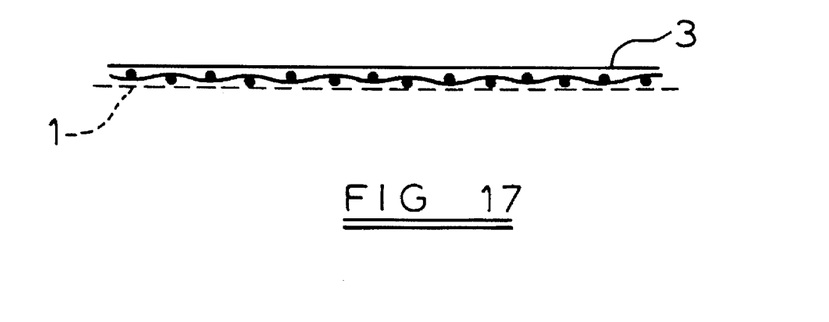
FIG. 17 is a cross-sectional view of an embodiment of a separate barrier means and displaced air flow enabling means for use in the container of FIG. 1.

It will be appreciated by the skilled person that instead of the protrusions in FIGS. 15 and 16 being integrally formed with the dish 1, such protrusions can be applied to the dish as a paint, lacquer or enamel or could constitute discrete components secured to the dish by an adhesive. Alternatively, suitable framework means could be located between the dish 1 and the barrier sheet to provide the required stand-off of the barrier sheet from the dish to allow lateral flow of the displaced air to the outlet holes in the dish. Such a framework could, for example, comprise a woven mesh arrangement as shown in FIG. 17.

The barrier sheet used with the arrangements of FIGS. 15, 16 and 17 can comprise any of the materials described hereinabove in connection with the sheet 3, such sheet being either air-pervious per se, or rendered permeable to air by provision of appropriate through-holes.

The resulting dish 1, with layer of compacted microporous thermal insulation material 13A as shown in FIG. 6, can be used in well-known manner to support well-known forms of electrical heating elements to form a radiant heater for a smooth top glass ceramic cooking appliance. However, the method of the invention is by no means restricted to such an application and may be used in general whenever requirements exist for compacting powdery microporous materials into containers which are substantially impervious to air.

It is to be noted that, although in the embodiments exemplified above air outlet regions have been shown comprising a plurality of holes 2 distributed peripherally around the base of the dish 1, one or more holes may alternatively or additionally be provided in other regions of the dish 1. It is also possible to dispense with some or all of the holes and to rely partly or wholly on an air outlet region provided as a narrow gap around the periphery of the press tool 11 between the press tool 11 and the wall of the housing 9 and ultimately between the press tool 11 and the rim of the dish 1. In this case, air permeating the barrier sheet 3 initially flows laterally and then past the edge of the press tool 11.

I claim:

1. A method of forming a layer of compacted powdery microporous material in a container of substantially air-impervious material, which method comprises the steps of:

providing a container of substantially air-impervious material, the container having a base, side walls and at least one air outlet region;

providing a press tool for compacting powdery microporous material into the container, the press tool being movable in a direction toward and away from the base of the container;

providing barrier means adjacent at least the base of the container, the barrier means being adapted and arranged to substantially prevent passage therethrough of microporous material during compaction thereof, whilst permitting permeation of air displaced therefrom during such compaction;

providing means to enable the displaced air permeating at least part of the barrier means during compaction of the microporous material to flow laterally of the direction of movement of the press tool between the at least part of the barrier means and at least the base of the container;

introducing powdery microporous material between the container and the press tool; and compacting the microporous material into the container by means of the press tool whereby air is displaced from within the microporous material, permeates the at least part of the barrier means, and flows laterally between the at least part of the barrier means and at least the base of the container toward the at least one air outlet region so as to be displaced from the container therethrough.

2. A method according to claim 1, wherein the microporous material comprises microporous thermal insulation material.

3. A method according to claim 1, wherein the at least one air outlet region is provided at a peripheral region of the container.

4. A method according to claim 1, wherein the at least one air outlet region comprises at least one hole in the container.

5. A method according to claim 1, wherein a plurality of air outlet regions is provided.

6. A method according to claim 1, wherein the barrier means comprises at least one layer of an inherently air-pervious material.

7. A method according to claim 6, wherein the air-pervious material is selected from the group consisting of air-pervious paper, fine mesh material, fine gauze material and cloth material.

8. A method according to claim 7, wherein the cloth material is selected from the group consisting of woven, mat and felt form.

9. A method according to claim 1, wherein the barrier means comprises at least one sheet of material provided with an array of holes therein dimensioned to allow displacement of air therethrough while substantially preventing passage of microporous material.

10. A method according to claim 9, wherein the at least one sheet of material is of a material which is pervious or impervious to air and selected from the group consisting of paper, card, metal foil, plastics and cloth material.

11. A method according to claim 1, wherein the means to enable lateral flow of the displaced air permeating the barrier means to the at least one air outlet region is provided separate from the barrier means.

12. A method according to claim 11, wherein the means to enable lateral flow of displaced air to the at least one air outlet region comprises a stand-off arrangement located on or integral with the inside surface of the container and serving to maintain sufficient separation of the barrier means and the container during compaction of the microporous material to enable the displaced air permeating the barrier means to flow laterally to the at least one air outlet region.

13. A method according to claim 12, wherein the stand-off arrangement is arranged between the barrier means and the container and is selected from the group consisting of a sheet of woven material and a framework.

14. A method according to claim 13, wherein the woven material comprises a woven mesh material.

15. A method according to claim 12, wherein the stand-off arrangement comprises at least one protrusion on the inside of the container and facing the barrier means.

16. A method according to claim 15, wherein the at least one protrusion is formed integrally with the container.

17. A method according to claim 16, wherein the protrusion is selected from the group consisting of at least one pip and at least one rib.

18. A method according to claim 15, wherein the at least one protrusion is applied to the container.

19. A method according to claim 18, wherein the at least one protrusion is in the form of a raised pattern.

20. A method according to claim 19, wherein the raised pattern comprises a material selected from the group consisting of paint, lacquer and enamel.

21. A method according to claim 18, wherein the at least one protrusion is in the form of at least one adhesively-secured discrete component.

22. A method according to claim 11, wherein the means to enable lateral flow of the displaced air comprises at least one channel recessed into the container and facing the barrier means, the at least one channel communicating with the at least one air outlet region.

23. A method according to claim 1, wherein the means to enable flow of the displaced air permeating the barrier means to the at least one air outlet region is provided integral with the barrier means.

24. A method according to claim 23, wherein the barrier means is formed on that surface thereof facing the container with means to enable flow of the displaced air permeating the barrier means to the at least one air outlet region.

25. A method according to claim 24, wherein part of the material of the barrier means is displaced in a direction toward the container.

26. A method according to claim 25, wherein part of the material of the barrier means is displaced by providing at least one plunged aperture through the barrier means from that side of the barrier means adjacent to the microporous material.

27. A method according to claim 23, wherein the barrier means is formed so as to present a quilted surface profile on that surface thereof facing the container.

28. A method according to claim 23, wherein the barrier means is formed so as to present a ribbed surface profile on that surface thereof facing the container.

29. A method according to claim 23, wherein the barrier means is formed so as to present a surface profile comprising a pattern of elevations on that surface thereof facing the container.

30. A method according to claim 23, wherein the barrier means is formed so as to present a surface profile comprising a pattern of channels on that surface thereof facing the container.

31. A method according to claim 23, wherein the barrier means is constructed in the form of a woven mesh material whereby that surface thereof facing the container is naturally profiled such that it inherently serves to channel the air displaced through the barrier means to the at least one air outlet region.

32. A method according to claim 1, wherein the area of the press tool corresponds substantially to the area of the base of the container.

33. A method according to claim 1, wherein the press tool is provided with at least one hole therethrough for the passage of air displaced from the microporous material during compaction thereof.

34. A method according to claim 1, wherein the container comprises a metal.

35. A method according to claim 1, wherein the container comprises a supporting dish of a radiant electric heater.

36. A method of forming a layer of compacted powdery microporous material in a container of substantially air-impervious material, which method comprises the steps of:

providing a container of substantially air-impervious material, the container having a base, side walls and at least one air outlet region;

providing a press tool for compacting powdery microporous material into the container, the press tool being movable in a direction toward and away from the base of the container;

providing barrier means adjacent at least the base of the container, the barrier means being constructed from first and second sheets of air-pervious material bonded together at predetermined spaced-apart discrete regions and adapted and arranged to substantially prevent passage therethrough of microporous material during compaction thereof, whilst permitting permeation of air displaced therefrom during such compaction, the barrier means enabling the displaced air permeating the first sheet of air-pervious material during compaction of the microporous material to flow laterally of the direction of movement of the press tool between the first and second sheets;

introducing powdery microporous material between the container and the press tool; and compacting the microporous material into the container by means of the press tool whereby air is displaced from within the microporous material, permeates the first sheet of air-pervious material of the barrier means, and flows laterally between the first and second sheets of air-pervious material toward the at least one air outlet region so as to be displaced from the container therethrough.

37. A method according to claim 36, wherein the barrier means is constructed from first and second sheets of air-pervious paper.

38. A method according to claim 36, wherein the first and second sheets are bonded together in the form of a dot pattern.

39. A method according to claim 36, wherein the microporous material comprises microporous thermal insulation material.

40. A method according to claim 36, wherein the at least one air outlet region is provided at a peripheral region of the container.

41. A method according to claim 36, wherein the at least one air outlet region comprises at least one hole in the container.

42. A method according to claim 36, wherein a plurality of air outlet regions is provided.

43. A method according to claim 36, wherein the area of the press tool corresponds substantially to the area of the base of the container.

44. A method according to claim 36, wherein the press tool is provided with at least one hole therethrough for the passage of air displaced from the microporous material during compaction thereof.

45. A method according to claim 36, wherein the container comprises a metal.

46. A method according to claim 36, wherein the container comprises a supporting dish of a radiant electric heater.

* * * * *